Patented July 28, 1953

2,647,120

UNITED STATES PATENT OFFICE 2,647,120

5-NITRO-2-THIOPHENECARBOXAMIDES

Thurmond A. Williamson, Dallas, Tex., assignor to E. I. du Pont de Nemours and Company, Wilmington, Del., a corporation of Delaware No Drawing. Application December 14, 1949, Serial No. 133,008

4 Claims. (Cl. 260—256.4)

This invention relates to 5-nitro-2-thiophenecarboxamides represented by the formula (1)

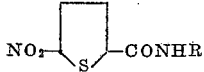

where R is a monovalent organic radical linked to the amido nitrogen thru carbon and containing a nitrogen atom.

The compounds of the invention are prepared by reacting 5-nitro-2-thiophenecarboxylyl halide with an amine derivative of an organic compound containing a nitrogen atom. This reaction is represented by the equation (2)

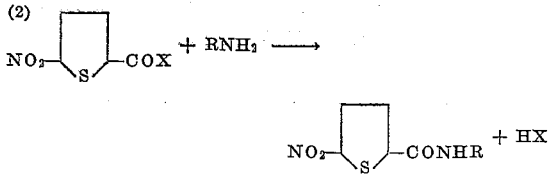

where X is halogen and preferably chlorine and R has the same significance as stated above.

The reaction between 5-nitro-2-thiophenecarboxylyl halide and the amine is most readily carried out in the presence of a basic solvent such as pyridine, triethylamine, N-methyl morpholine, quinoline, or aqueous inorganic base such as sodium hydroxide solution and is facilitated by moderate heating. The reaction goes rapidly and use of a catalyst is unnecessary.

The radical containing the nitrogen atom as represented by R in Formula 1 is preferably a cyclic organic radical linked to the amido nitrogen thru carbon and containing nitrogen as an heterocyclic atom.

Illustrative of the compounds of the invention are the 5-nitro-2-thiophenecarboxamides as represented by Formula 1 in which R is one of the following radicals: pyrryl, pyrazolyl, imidazolyl, pyridyl, pyrimidyl, pyridazyl, indyl, piperidyl, pyrazinyl, pyrazolidyl, pyridonyl, and piperazyl; also sulfamyl phenyl, dialkylaminoalkyl such as 4-diethylamino-1-methylbutyl, and carboxamides such as carbamylphenyl and carbamylbutyl.

The 5-nitro-2-thiophenecarboxamides of the invention are light colored solids usually yellow, light green, or yellow green. The compounds are, in general, water-insoluble to slightly water-soluble. Most members are soluble in acetone and alcohol but there are some exceptions.

The compounds of the invention are particularly valuable because of their bactericidal properties. The compounds are also useful as antioxidants, dye intermediates, rubber accelerators, and acid inhibitors.

The following examples illustrate typical compounds of the invention and methods for their preparation.

EXAMPLE I 5-nitro-N-2-pyrimidyl-2-thiophenecarboxamide

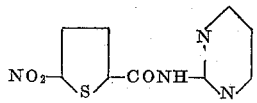

To a solution of 14 parts by weight of 5-nitro-2-thiophenecarboxylylchloride in 100 parts by weight of dry, redistilled pyridine, 7 parts by weight of 2-aminopyrimidine was added portionwise with stirring and external cooling. After all was added the dark mixture was heated at 60° C. for twenty minutes, then the pyridine was removed in vacuo. The residue was stirred with cold water to crystallize the product, which was then collected, washed well with water and dried. It weighed 13.0 parts by weight and melted at 200–205° C. Three crystallizations from ethanol gave pale yellow needles of M. P. 207.5–208° C.

Anal.: Calcd. for $C_9H_6N_4O_3S$: C, 43.20; H, 2.42. Found: C, 43.40; H, 2.58.

EXAMPLE II 5-nitro-N-(4-diethylamino-1-methylbutyl)-2-thiophenecarboxamide

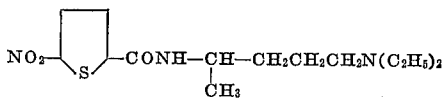

To a solution of 12.4 parts by weights of 4-diethylamino-1-methylbutylamine in 25 parts by weight of pyridine, 15 parts by weight of 5-nitro-2-thiophenecarboxylylchloride was added portionwise with stirring. After addition was complete, the mixture was warmed to 60° C. for 15 minutes and poured into an excess of water. The solution was made alkaline with dilute sodium hydroxide solution and the precipitated solid was collected, washed well with water and dried to give 19.2 parts by weight of tan solid, M. P. 90–97°. Purification by precipitation from dilute hydrochloric acid solution with decolorization gave a light green solid of M. P. 99–101°.

The hydrochloride of the above amine was prepared by passing anhydrous hydrogen chloride through an ethereal solution of the amine. The salt was quite hygroscopic and was placed in a vacuum desiccator immediately after filtration from ether. It was a near colorless solid of M. P. 130–132°. A sample was crystallized from ethanol to a colorless powder, M. P. 133–134°.

EXAMPLE III

*5-nitro-N-2-thiazolyl-2-thiophenecarboxamide*

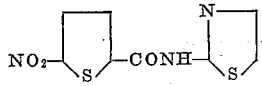

A solution of 9.5 parts by weight of 5-nitro-2-thiophenecarboxylylchloride in 40 parts by weight of dry pyridine was treated slowly with 5.0 parts by weight of 2-aminothiazole. Considerable heat was liberated on addition. The mixture was warmed at 60° C. for 15 minutes, poured into an excess of water and acidified with dilute hydrochloric acid. The yellow solid was collected, washed well with water and dried to give 10.2 parts by weight of yellow solid melting at about 300° C. with decomposition. It could not be dissolved in any common organic solvent.

EXAMPLE IV

*6-(5-nitro-2-thenoylamido) nicotinic acid*

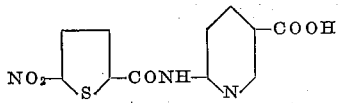

A solution of 9.5 parts by weight of 5-nitro-2-thiophenecarboxylylchloride in 50 parts by weight of dry pyridine was treated with 6.9 parts by weight of 2-amino-nicotinic acid portionwise with stirring. The mixture was warmed at 60° C. for 15 minutes, poured into ice water and acidified with dilute hydrochloric acid. On standing in the cold, a pale yellow solid separated, was collected, washed and dried. It weighed 6.2 parts by weight and melted at 290–300° with decomposition.

I claim:

1. A 5-nitro-2-thiophenecarboxamide represented by the formula

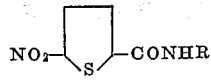

where R is a 5 to 6 member N-heterocyclic radical selected from the group consisting of pyrryl, pyrazolyl, imidazolyl, pyridyl, pyrimidyl, pyridazyl, indyl, piperidyl, pyrazinyl, pyrazolidyl, pyridonyl, piperazyl, thiazolyl, and carboxypyridyl, said heterocyclic radical being linked to the amido nitrogen through a carbon atom of the N-heterocyclic ring.

2. 5 - nitro-N-2-pyrimidyl-2-thiophenecarboxamide.

3. 5 - nitro-N-2-thiazolyl-2 - thiophenecarboxamide.

4. A process for the preparation of a 5-nitro-2-thiophenecarboxamide which comprises reacting a 5-nitro-2-thiophenecarboxylyl halide in the presence of a basic solvent with an amine of a 5 to 6 member N-heterocyclic ring compound represented by the formula RNH₂, where R is a radical selected from the group consisting of pyrryl, pyrazolyl, imidazolyl, pyridyl, pyrimidyl, pyridazyl, indyl, piperidyl, pyrazinyl, pyrazolidyl, pyridonyl, piperazyl, thiazolyl, and carboxypyridyl.

THURMOND A. WILLIAMSON.

References Cited in the file of this patent

UNITED STATES PATENTS

| Number | Name | Date |
|---|---|---|
| 2,505,253 | Lee et al. | Apr. 25, 1950 |